US010759431B2

(12) United States Patent
Fritz et al.

(10) Patent No.: US 10,759,431 B2
(45) Date of Patent: Sep. 1, 2020

(54) ENHANCED BRAKING METHOD AND APPARATUS FOR HYBRID MACHINE

(71) Applicant: DEERE & COMPANY, Moline, IL (US)

(72) Inventors: Justin E. Fritz, Dubuque, IA (US); Kevin W. Campbell, Dubuque, IA (US); Todd F. Velde, Dubuque, IA (US); Brian K. Kellogg, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 38 days.

(21) Appl. No.: 16/014,031

(22) Filed: Jun. 21, 2018

(65) Prior Publication Data

US 2019/0389468 A1 Dec. 26, 2019

(51) Int. Cl.
| | |
|---|---|
| *B60W 10/06* | (2006.01) |
| *B60W 10/08* | (2006.01) |
| *B60W 10/18* | (2012.01) |
| *B60W 30/18* | (2012.01) |
| *B60W 10/30* | (2006.01) |
| *B60W 20/15* | (2016.01) |

(52) U.S. Cl.
CPC ...... *B60W 30/18136* (2013.01); *B60W 10/06* (2013.01); *B60W 10/08* (2013.01); *B60W 10/18* (2013.01); *B60W 10/30* (2013.01); *B60W 20/15* (2016.01); *B60W 2510/0676* (2013.01); *B60W 2510/087* (2013.01); *B60W 2520/10* (2013.01); *B60W 2540/12* (2013.01); *B60W 2540/16* (2013.01)

(58) Field of Classification Search
None
See application file for complete search history.

(56) References Cited

U.S. PATENT DOCUMENTS

| | | | |
|---|---|---|---|
| 7,009,508 B2 | 3/2006 | Vertenten | |
| 7,086,503 B2 | 8/2006 | Miller et al. | |
| 7,460,941 B2 | 12/2008 | Sychra et al. | |
| 8,386,131 B2 | 2/2013 | Thaduvayi et al. | |
| 8,395,335 B2 | 3/2013 | Marchand et al. | |
| 8,649,926 B2 | 2/2014 | Baino et al. | |
| 9,348,327 B2 * | 5/2016 | Mizuochi | E02F 9/265 |

(Continued)

FOREIGN PATENT DOCUMENTS

| | | |
|---|---|---|
| DE | 112011102768 T5 | 9/2013 |
| WO | 2011112138 A1 | 9/2011 |

OTHER PUBLICATIONS

German Search Report issued in counterpart application No. 102019208422.2, dated Mar. 4, 2020 (10 pages).

*Primary Examiner* — Genna M Mott
*Assistant Examiner* — Melanie J Patrick
(74) *Attorney, Agent, or Firm* — Taft Stettinius & Hollister LLP; Stephen F. Rost (57) ABSTRACT

A system for controlling the speed of a hybrid work machine that has an engine assembly, an electric drive system mechanically coupled to the engine assembly, a drive mechanism configured to be driven by the electric drive system, and a controller in communication with the engine assembly, the electric drive system, and the drive mechanism. Wherein, the controller selectively engages the engine assembly, the electric drive system, and the drive mechanism to execute a braking function.

20 Claims, 4 Drawing Sheets

(56) References Cited

U.S. PATENT DOCUMENTS

| | | | |
|---|---|---|---|
| 9,744,872 B2 | 8/2017 | Hoffmann et al. | |
| 2004/0255904 A1* | 12/2004 | Izawa | B60W 10/06 |
| | | | 123/352 |
| 2006/0069487 A1 | 3/2006 | Sychra et al. | |
| 2010/0280695 A1* | 11/2010 | Mulot | B60K 6/365 |
| | | | 701/22 |
| 2011/0022276 A1 | 1/2011 | Thaduvayi et al. | |
| 2012/0175200 A1* | 7/2012 | Sagan | B60T 1/10 |
| | | | 188/159 |
| 2012/0221195 A1 | 8/2012 | Eliasson et al. | |
| 2014/0277876 A1* | 9/2014 | Holmes | B60W 10/06 |
| | | | 701/22 |
| 2015/0285161 A1* | 10/2015 | Ulrey | B60W 20/16 |
| | | | 477/3 |
| 2016/0179128 A1* | 6/2016 | Guglielmo | B66F 11/04 |
| | | | 182/19 |
| 2016/0236688 A1* | 8/2016 | Mei | B60W 30/18136 |
| 2017/0166210 A1* | 6/2017 | Kim | B60W 30/18118 |
| 2018/0065621 A1* | 3/2018 | Merkle | B60L 50/15 |
| 2018/0162397 A1* | 6/2018 | Eo | B60W 20/15 |
| 2019/0023265 A1* | 1/2019 | Takeda | B60L 15/2009 |

\* cited by examiner

ENHANCED BRAKING METHOD AND APPARATUS FOR HYBRID MACHINE

FIELD OF THE DISCLOSURE

The present disclosure relates to managing a braking priority of a work machine, and more specifically to managing a braking priority of a work machine that includes an electro-hydraulic braking system.

BACKGROUND OF THE DISCLOSURE

Work machines frequently have more than one system that can providing a braking force to the work machine. Many work machines have gas or diesel engines that provide a braking force to the work machine when a user provides an input requiring a braking force. The engine is provided select amounts of fuel to power the work machine. The power provided to the work machine from the engine allows the work machine to move on an underlying surface along with providing power to any number of sub-assemblies. The sub-assemblies often include a hydraulic pump that provides hydraulic fluid to hydraulic components of the work machine. The demands on the engine may vary based on the desired speed of the work machine and the needs of the hydraulic components.

Many work machines control the velocity of the work machine by mechanically coupling one or more ground engaging mechanisms to the engine through a transmission. If the work machine requires an increase in velocity, more fuel is supplied to the engine causing it to rotate at a faster speed. In turn, the engine increases the speed of the ground engaging mechanism and the velocity of the work machine is increased.

In one example, when the velocity of a typical work machine needs to be reduced, the fuel provided to the engine is reduced and the engine provides a braking force to the ground engaging mechanism. If the engine braking force is not sufficient to slow the work machine and the velocity of the work machine increases, in a downhill condition for example, the ground engaging mechanism may cause the engine to rotate higher speeds than the engine is designed to handle.

Accordingly, many work machines have a brake system that a user may engage to slow the work machine. The brake system is often a hydraulic system that applies a brake to the transmission or ground engaging mechanism responsive to a user input. In this configuration, the brake system is often engaged while the engine is defueled to facilitate slowing the work machine.

Many hybrid work machines add an electrical motor, generator, or both to help manage the power of the work machine. In the hybrid work machine, the motor and generator, or motor-generator, may be utilized by the work machine to provide a braking force when a decrease in velocity is required. In the hybrid work machine the braking force is applied, in part, by the generator, or motor-generator, converting the mechanical energy generated by the work machine into electrical energy that can be stored or released by the work machine. Often the electrical energy produced by the generator or motor-generator is stored in batteries. However, if too much electrical energy is created as part of the braking function, the generator or motor-generator often uses electronic brake resistors to manage the access electrical energy generated during a braking function.

SUMMARY

One embodiment is a system for controlling the speed of a hybrid work machine that has an engine assembly, an electric drive system mechanically coupled to the engine assembly, a drive mechanism configured to be driven by the electric drive system, and a controller in communication with the engine assembly, the electric drive system, and the drive mechanism. Wherein, the controller selectively engages the engine assembly, the electric drive system, and the drive mechanism to execute a braking function.

One example of this embodiment has an electro-hydraulic brake system coupled to the drive mechanism, wherein the electro-hydraulic brake system is selectively applied by the controller to execute the braking function. In one aspect of this example, when the controller identifies a speed reduction command that is greater than a speed reduction threshold, the controller applies a braking force to the drive mechanism with the electro-hydraulic brake system. In another aspect of this example, when the speed reduction command is less than the speed reduction threshold, the controller engages the engine assembly and the electric drive system to apply a braking force and does not engage the electro-hydraulic assembly.

Another example has user controls that send a required brake force command to the controller, wherein the controller compares the required brake force command to a brake force threshold and directs braking force commands to the engine assembly, electric drive system, and drive mechanism based on the comparison of the required brake force command to the brake force threshold.

In yet another example the engine assembly implements a compression release brake procedure as part of an engine assembly braking function.

In another example, the controller selectively applies the braking function with the engine assembly, electric drive system, and drive mechanism based on a braking priority stored in the controller, wherein the braking priority initiates an engine braking function with the engine assembly and an electric braking function with the electric drive system prior to executing a drive mechanism braking function with drive mechanism.

In yet another example, the drive mechanism has at least one axle and at least one brake positioned at the axle and controlled by the controller through an electro-hydraulic system, wherein the controller selectively applies the brake to initiate a drive mechanism braking function.

In one example, the braking function is executed when a vehicle speed is greater than a vehicle speed threshold.

Another embodiment is a method for controlling the speed of a hybrid vehicle that includes providing an engine assembly having an engine, an electric drive system mechanically coupled to the engine, a drive mechanism configured to be driven by the electric drive system and having an electro-hydraulic brake system, and a controller in communication with the engine assembly, the electric drive system, and the electro-hydraulic brake system, identifying, with the controller, a vehicle speed reduction signal, selectively executing, with the controller, an engine brake procedure, an electric drive system brake procedure, and a drive mechanism brake procedure responsive to the vehicle speed reduction signal.

In one example of this embodiment, the drive mechanism brake procedure is executed by the controller by engaging a hydraulic brake with the electro-hydraulic brake system. In one aspect of this example, the hydraulic brake is positioned about an axle of the hybrid vehicle to selectively apply a braking force to the axle.

In another example of this embodiment, the engine brake procedure includes implementing a compression release orientation of a valve assembly of the engine.

In yet another example, the engine assembly includes at least one parasitic device selectively coupled to the engine by the controller, wherein the controller couples the parasitic device to the engine during the engine brake procedure. In one aspect of this example, the parasitic device is a fan.

In another example of this embodiment, the controller executes the engine brake procedure and defuels the engine before executing the drive mechanism brake procedure.

Yet another example includes storing an engine brake capacity, electronic assembly brake capacity, and a drive mechanism brake capacity, determining, with the controller, a required brake capacity based on the vehicle speed reduction signal, and implementing the drive mechanism brake procedure only when the required brake capacity is greater than the combined engine brake capacity and the electronic assembly brake capacity.

Another example includes monitoring, with the controller, at least one of an engine assembly temperature, an electric drive system temperature, and a drive mechanism temperature and modifying the engine brake procedure, electronic assembly brake procedure, and drive mechanism brake procedure based on the monitoring step.

Yet another embodiment of the present disclosure is a work machine with an engine assembly coupled to a drive mechanism to selectively provide a braking force to the drive mechanism up to a maximum engine braking force, an electro-hydraulic brake assembly that selectively applies a supplemental braking force to the drive mechanism, a braking force indicator, and a controller in communication with the engine assembly, the electro-hydraulic brake assembly, and the braking force indicator. Wherein, the controller identifies a required braking force with the braking force indicator and applies the supplemental braking force when the required braking force is greater than the maximum engine braking force.

In one example of this embodiment, the braking force indicator is any one of a forward-neutral-reverse lever, a brake pedal, a switch, a cruise control interface, or a speed governor.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 2 is a schematic view of a control system of the work machine of FIG. 1a.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

In some series hybrid vehicles, the vehicle has an internal combustion engine, a generator, a traction motor, a brake resistor, and a DC bus ("DC" means direct current) to which the generator, the traction motor, and the brake resistor are electrically coupled. The generator converts mechanical energy from the engine into electric energy on the bus and can operate in the opposite direction or be back-driven to convert electric energy from the bus into mechanical energy to assist the engine with other functions on board the vehicle (e.g., raising a bucket hydraulically). The traction motor converts electric energy from the bus into mechanical energy for use in driving one or more traction elements (e.g., ground-engaging wheels) ("motoring") and can operate in the opposite direction or be back-driven to convert mechanical energy into electric energy on the bus ("electric braking").

Regarding vehicle direction reversals, the vehicle may have a FNR control operable by the vehicle operator ("FNR" means forward, neutral, and reverse). If the FNR control is switched from forward to reverse or reverse to neutral, the motor is commanded to operate to decrease its speed to zero by electric braking to supply electric energy to the bus and then increase its speed by motoring to remove electric energy from the bus.

The DC bus voltage of the DC bus is monitored. According to a hysteretic control scheme, if the DC bus voltage exceeds a DC bus threshold (e.g., due to electric braking of the motor without sufficient motoring of the generator), the brake resistor is operated in a constant ON state to dissipate electric energy from the DC bus. If the DC bus voltage is lower than the DC bus threshold, the brake resistor is in a constant OFF state.

Figure 1A:
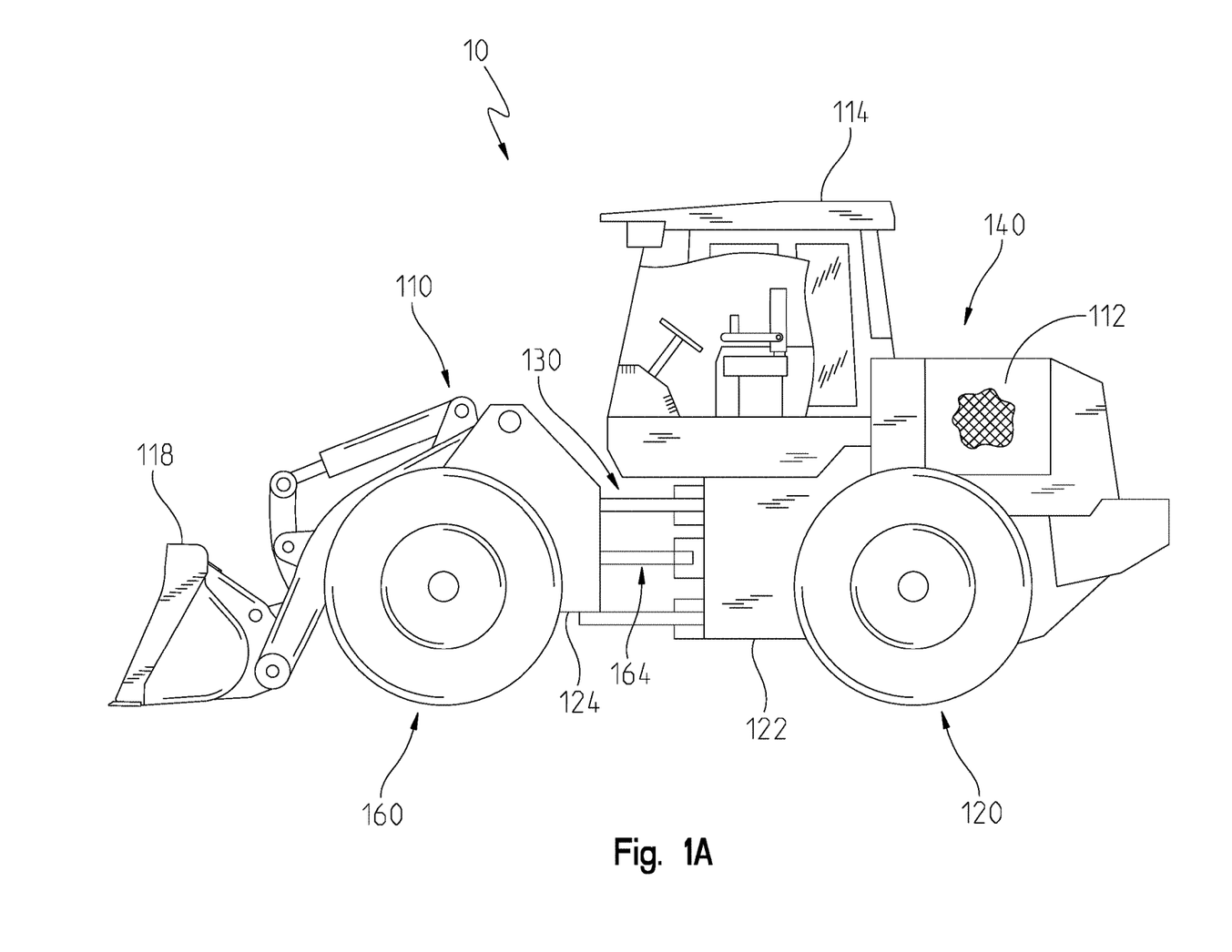
FIG. 1a is a side view of a work machine.

FIG. 1a illustrates an exemplary work machine or vehicle 10 or vehicle including a front section 110 and a rear section 140. The rear section 140 includes a vehicle engine or motor 112 or other prime mover, an operator cab 114 and a rear axle and wheels 120 coupled to a rear frame 122. The front section 110 includes a front axle and wheels 160 coupled to a front frame 124. The motor 112, front axle and wheels 160, and rear axle and wheels 120 may be a part of a drive system that provides movement to the vehicle 10. The drive system may control the available speed and direction of the vehicle 10.

The front frame 124 of the front section 110 is coupled to the rear frame 122 of the rear section 140 by articulation joint 130. The articulation joint 130 enables the front section 110 and the rear carrying section 140 to pivot relative to one another about a vertical axis for steering the work machine 100.

In one aspect of this disclosure, one or more hydraulic cylinder assembly 164 may be coupled to the rear section 140 on one end and to the front section 110 at the other. The hydraulic cylinder assembly 164 may be coupled to a hydraulic system and capable of providing a plurality if linear displacements. More specifically, the hydraulic cylinder assembly 164 may have a cylinder and a rod that is partially positioned within the cylinder. The rod may be coupled to a piston within the cylinder that is repositionable therein. As the piston slides within the cylinder, the rod may similarly be repositioned relative to the cylinder. Accordingly, the rod may be coupled to the rear section 140 and the cylinder may be coupled to the front section 110, or vice versa, to provide a steering input to the user.

While a single hydraulic cylinder is described above, a person skilled in the relevant art understands that more than one hydraulic cylinder may be utilized to pivot the sections 140, 110 relative to one another. More specifically, a hydraulic cylinder may be located on either side of the vertical axis to pivot the front section 110 relative to the rear section 140. In this configuration, as one hydraulic assembly is becoming elongated the other hydraulic assembly may be shortened. Accordingly, no particular number of hydraulic assemblies is limiting, and this disclosure considers any number of hydraulic cylinders utilized for steering.

While a particular vehicle 10 is shown herein, this disclosure is considered for other types of work machines as well. More specifically, this disclosure applies at least to any type of work machine that utilizes a drive system that is engaged to alter the speed of the work machine. Accordingly, this disclosure considers applications other than the vehicle 10 illustrated herein.

Figure 1B:
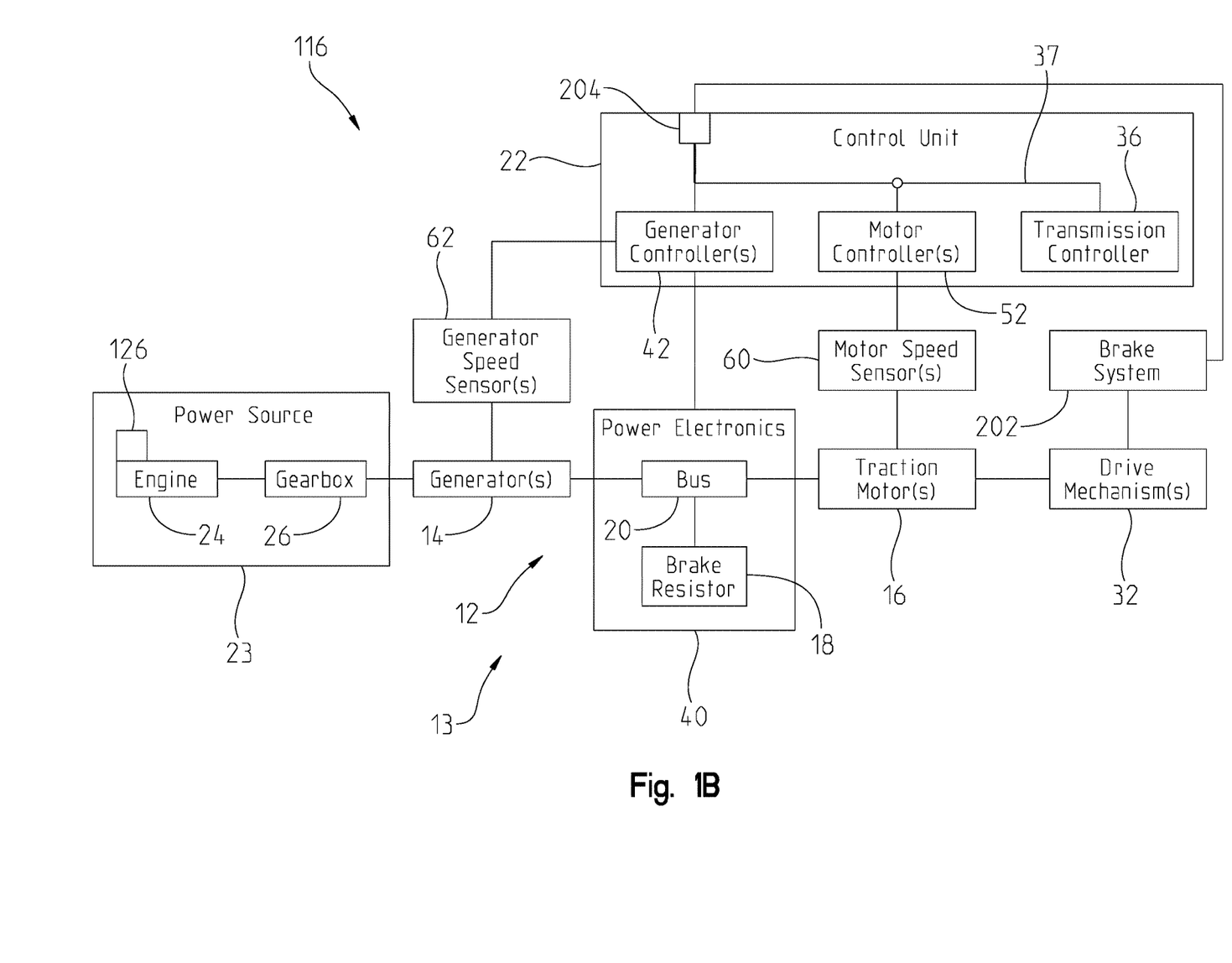
FIG. 1b is a diagrammatic view of the work machine if FIG. 1a having an electric drive system.

Referring now to FIG. 1b, there is shown diagrammatically a series hybrid vehicle drive system 116 having an electric drive system 12 of a power train 13 of the vehicle 10. The vehicle 10 may be a work vehicle (e.g., construction, forestry, agriculture, turf, to name but a few) or any other type of vehicle having an electric drive system. By way of example, the vehicle 10 may be a four-wheel drive loader having a front section and a rear section articulated to the front section, the front section having, for example, a bucket 118 for digging and dumping material, the rear section having, for example, the operator's station and the engine compartment rearward thereof as illustrated in FIG. 1a.

The electric drive system 12 has a generator 14, a traction motor 16, a brake resistor 18, a bus 20 (e.g., a DC bus), and a control unit 22. The generator 14, the traction motor 16, and the brake resistor 18 may be coupled electrically to the bus 20. The control unit 22 may be configured to determine a pulse-width-modulation (PWM) duty cycle for the brake resistor ("brake duty") and control operation of the brake resistor 18 according to the brake duty, wherein the brake duty can be a value intermediate of constant OFF and constant ON. The brake duty establishes the duration of time that the brake resistor 18 is ON with respect to the period of a brake resistor control signal that controls operation of the brake resistor. A variety of PWM schemes may be used, such as, for example, modifying the falling edge of the ON-pulse of the brake resistor control signal.

An engine assembly or power source 23 of the power train 13 may have an engine 24 configured to provide motive power for the vehicle 10. The engine 24 may be configured, for example, as diesel engine or other internal combustion engine, which may operate at a generally constant speed (e.g., 1800 revolutions per minute). However, the engine may experience, or be allowed to experience, some minimal speed variation due to, for example, load on the engine or mechanical energy put back on the engine by the generator 14. Collectively, the power source 23 and the electric drive system 12 may be referred to as a series hybrid-electric drive system.

The engine 24 may be coupled directly or indirectly to the generator 14 to establish a mechanical or other connection between the engine 24 and the generator 14. For example, the engine assembly or power source 23 may have a gearbox 26 that is coupled between the engine 24 and the generator 14. The gearbox 26 may provide an increase in speed from the engine 24 to the generator 14, allowing the generator 14 to be reduced in physical size and power (i.e., continuous load capacity). It is within the scope of this disclosure eliminate the gearbox 26 such that the engine 24 is coupled to the generator 14 without an intermediate gearbox 26. The engine 24 (or the gearbox 26) may have a number of other outputs to operate one or more hydraulic pumps, etc. of the vehicle 10.

The generator 14 may be configured to convert mechanical energy into electric energy ("generating mode"), or to convert electric energy into mechanical energy like a motor ("motoring mode"). In the generating mode, the generator 14 is operable to convert mechanical energy from the power source 23 into electric energy to supply electric energy onto the bus 20. In the motoring mode, the generator 14 is operable to remove electric energy from the bus 20 and convert it into mechanical energy for the power source 23, which may be useful, for example, to assist the engine 24 with a load such as, for example, a hydraulic load (e.g., raise a bucket hydraulically). Exemplarily, the generator 14 may take the form of a high-speed three-phase interior-permanent-magnet brushless synchronous generator having three phase coils, or other suitable form.

The generator 14 may be under the control of a generator controller 42. The generator controller 42 may receive a DC bus voltage command from a transmission controller 36 via a communications bus 37 (e.g., CAN bus) commanding the generator controller 42 to control the generator 14 so as to try to maintain the voltage of the DC bus 20 at a nominally constant voltage (the nominal DC bus voltage) (e.g., 700 VDC). The generator controller 42 may receive voltage readings of the actual voltage of the bus 20 from a voltage sensor coupled electrically to the bus 20. Using closed-loop voltage control, such as PI-based voltage control, the generator controller 42 may operate the generator 14 in the generating mode or the motoring mode to try to maintain the voltage of the DC bus 20 nominally at the nominal DC bus voltage (which is the voltage setpoint for the PI-based voltage control). The generator controller 42 may determine a generator torque setpoint T gen at which to operate the generator 14 to achieve the nominal DC bus voltage (adjustments in T gen may be made, for example, to avoid generator overheating), and may command operation of the generator 14 at such setpoint.

The motor 16 may be configured to convert electrical energy into mechanical energy ("motoring mode"), or to convert mechanical energy into electric energy ("braking mode"). In the motoring mode, the motor 16 is operable to remove electric energy from the bus 20 and convert it into mechanical energy. In the braking mode, the motor 16 is operable to convert mechanical energy into electric energy so as to supply electric energy onto the bus 20 thereby braking (i.e., slowing down) the rotational speed of the motor 16 and thus the speed of the vehicle 10. Exemplarily, the motor 16 may take the form of a three-phase interior-permanent-magnet brushless synchronous motor having three phase coils, or other suitable form, which is operable at a variable speed within a speed range (negative and positive speed limit).

The motor 16 may be under the control of a motor controller 52. Further, the rotational speed of the motor 16 may be indicated by use of a motor speed sensor 60 coupled electrically to the motor controller 52 and positioned to sense the rotational speed of the motor 16. The motor controller 52 may receive a torque request from the transmission controller 36. The torque request may be for motoring in the motoring mode or electric braking in the braking mode. The motor controller 52 may establish a motor torque at the torque request or adjust the motor torque setpoint from the torque request if it determines there is a need to so (e.g., to avoid motor overheating). The motor controller 52 may thereafter command operation of the motor 16 at the motor torque setpoint.

The brake resistor 18 may be configured to dissipate electric energy on the bus 20 as heat. The dissipated energy may be transferred as heat from the brake resistor 18 to liquid coolant or other suitable cooling media. The brake resistor 18 may take the form of a bank of resistors having a number of discrete resistor elements that may be arranged (e.g., in series and in parallel) to provide a desired resistance and may be water-cooled (e.g., using liquid engine coolant).

The bus 20 may be configured as a DC bus. The bus 20 may have a positive DC power rail and a negative DC power rail. The nominal voltage of the bus 20 between the positive and negative DC power rails may be, for example, 700 Volts DC ("VDC").

The power train 13 may have a drive assembly or drive mechanism 32 to transmit motive power from the traction motor 16 to the ground. The drive mechanism 32 may have, for example, a multi-speed transmission 34 (e.g., three-speed transmission) under the control of a transmission controller 36 and two drive outputs. Each drive output may have an axle coupled to the transmission 34, a traction element (e.g., a wheel or track), and a final drive providing a fixed gear reduction between the axle and the traction element. As such, the drive mechanism 32 may provide a mechanical connection between the motor 16 and the traction elements.

The bus 20 and the brake resistor 18 may be included in an electronics assembly or power electronics 40 of the electric drive system 12. The power electronics 40 may be under the control of the control unit 22, which is coupled electrically to the power electronics 40, and may interconnect electrically the generator 14 and the traction motor 16. As such, the power electronics 40 under the control of the control unit 22 may be used to manage the interconnection between the generator 14 and the traction motor 16 and to control the brake resistor 18. The control unit 22 and the power electronics 40 cooperate to provide sufficient microprocessor and power semiconductor technology to monitor and regulate the attached electromechanical devices.

The power electronics 40 may include a brake chopper to control use of the brake resistor 18 to dissipate electric power from the bus 20. When the appropriate voltage is applied to the brake chopper, the collector may be coupled electrically to an emitter to allow dissipation of electric power through the brake resistor 18. The gate driver for the brake chopper may issue the brake resistor control signal in the form of, for example, a pulse-width modulated voltage signal, the voltage signal being pulse-width modulated according to the brake duty to turn the brake resistor 18 ON, to dissipate electric energy from the bus 20, and OFF correspondingly.

The electric drive system 12 may have one or more voltage sensors to sense the actual bus voltage. Such voltage sensors may be stand-alone voltage sensors or may be included in any of the controllers 42, 52 of the control unit 22. For example, one or both of the controllers 42, 52 may have a voltage sensor coupled electrically to sense the actual bus voltage. Each controller 42, 52 may have such a voltage sensor, which may be included in the respective controller 42, 52 (i.e., on the control board of that controller). Alternatively, one or both voltage sensors may each be a stand-alone voltage sensor, to have a single stand-alone voltage sensor or two separate such sensors.

If excess voltage is on the bus 20 as detected by a voltage sensor due, for example, to electric braking of the motor 16, the generator controller 42 may, per its closed-loop voltage control scheme (e.g., PI-based voltage control), as a matter of priority seek to put the associated excess energy on the power source 23. The excess energy may be utilized, for example, to assist the engine 24 with a hydraulic load (e.g., raise a bucket hydraulically) or other load by operating the generator 14 in its motoring mode to convert electric energy from the bus 20 into mechanical energy. If the rotational speed of the engine 24 ("engine speed") reaches a speed threshold, due, for example, to the energy put on the power source 23 by motoring of the generator 14, the generator controller 42 may cease or otherwise prevent operation of the generator 14 in the motoring mode. This operation may tend to cause a rise in the bus voltage and associated electric energy on the bus 20 upon continued electric braking of the motor 16. Accordingly, the brake resistor 18 may be operable according to a brake resistor control scheme to dissipate such excess electric energy.

The rotational speed of the engine 24 may be indicated by use of a generator speed sensor 62 coupled electrically to the generator controller 42 and positioned to sense the rotational speed of the shaft of the generator 14, such generator speed being indicative of the engine speed. It is contemplated that the speed sensor could be positioned in other locations to sense a speed indicative of the rotational speed of the engine 24 (e.g., output shaft of the engine 24).

The control unit 22 may be configured to perform a brake resistor control scheme. The control unit 22 may be configured to control operation of the brake resistor 18 according to the brake resistor control scheme to dissipate excess electric energy (actual or anticipated) from the bus 20.

In one non-exclusive example, the control unit 22 may determine whether a power difference is positive (indicating an excess power available from the bus 20). If the power difference is positive, the control unit 22 commands the motor 16 to operate in the motoring mode to remove power from the bus 20. If the power difference is positive (indicating an excess power estimated available from the bus 20), but the motor 16 is commanded to operate in the braking mode to supply power to the bus 20, the amount of power predicted to be supplied to the bus 20 by the motor 16 would increase the excess power even more. This increase may result in an appropriate brake duty to manage the excess power. In one aspect of this disclosure, the control unit 22 may utilize an electro-hydraulic brake system 202 to facilitate braking the vehicle 10 without adding energy to the bus 20 through operating the motor 16 in braking mode.

If the power difference is negative (indicating that the estimated power available from the bus 20 is less than the reference bus power by a deficit power) and the motor 16 is commanded to operate in the motoring mode so as to remove power from the bus 20, the amount of power predicted to be removed from the bus 20 by the motor 16 would increase the deficit power even more. If the power difference is negative (indicating a deficit power) but the motor 16 is commanded to operate in the braking mode so as to supply power to the bus 20, the amount of power predicted to be supplied to the bus 20 by the motor 16 may counter-balance the deficit power or may be sufficient to produce an excess power resulting in an appropriate brake duty to manage the excess power.

In one aspect of this disclosure, the control unit 22 determines a brake duty for the brake resistor 18. In one non-limiting example, the control unit 22 commands operation of the brake resistor 18 according to the brake duty, in order to dissipate excess electric energy from the bus 20. The control unit 22 ceases brake resistor operation when the bus 20 no longer requires the brake resistor 18 to dissipate excessive electricity in the electric drive system 12.

As mentioned above, the electric drive system 12 may have a control unit 22. The control unit 22 may include one or more controllers to perform the various functions of the control unit 22. For example, in the case of a single generator 14 and a single motor 16, the control unit 22 may have a generator controller 42 for the generator 14 and a motor controller 52 for the motor 16. Further, the control unit 22 may include one or more brake system controller 204 for selectively engaging the electro-hydraulic braking system 202.

The controllers 42, 52, 36, 202 may be coupled electrically to a communication bus (e.g., CAN bus). In addition, in either example, such as in the second example, there may be a high-speed communication interface (e.g., 500 kbaud CAN bus) just between the generator and motor controllers 42, 52, allowing communication between the controllers 42, 52. In this way, even though the generator controller 42 may have direct control over the brake resistor 18 thereof, the motor controller 52 may exercise control over the brake resistor 18 thereof via the generator controller 42. On the other hand, the motor controller 52 may be coupled electrically to the brake resistor 18 to have direct control over the brake resistor 18 thereof, and the generator controller 42 may exercise control over the brake resistor 18 thereof via the motor controller 52. It is to be understood that other controller layouts may be used for the control unit 22. For example, the controllers 42, 52, 36, 202 may be consolidated into a single controller.

The electric drive system 12 may have more than one generator 14 or more than one traction motor 16, each coupled electrically to the bus 20 (as indicated in FIG. 1b by the pluralizer "(s)"). As such, the electric drive system 12 may have only one generator 14 and multiple traction motors 16, multiple generators and only one traction motor 16, or multiple generators 14 and multiple traction motors 16. In the case of multiple generators 14, the generators 14 may be arranged in parallel to one another between the power source 23 and the bus 20. In the case of multiple motors 16, the motors 16 may be arranged in parallel between the bus 20 and the ground. Each generator 14 may be configured to operate in the generating and the motoring modes and each motor 16 may be configured to operate in the motoring and braking modes.

The control unit 22 may have a separate generator controller 42 for each generator 14 and a separate motor controller 52 for each motor 16. In such a case, there may be a respective power converter under the control of the respective generator controller 42 and a respective power converter under the control of the respective motor controller 52.

The control schemes described herein may be modified to account for additional generators and motors. For example, the braking force input by the generators and motors may be dependent on the number and location of the corresponding generators and motors. However, the teachings of this disclosure are applicable for any number and location of motors and generators in a hybrid vehicle system.

In one aspect of this disclosure the hybrid vehicle 10 is illustrated having an electro-hydraulic braking system 202 positioned in the power train 13. The braking system 202 may be controlled by one or more of the controllers in the control unit 22 or the braking system 202 may have a dedicated controller 204. Regardless of the source, the braking system 202 may be selectively applied to provide varying degrees of braking force on the drive mechanism 32 of the vehicle 10.

The braking system 202 may include one or more brake assemblies that can selectively apply a braking force to the vehicle 10. More specifically, the brake assemblies may be brake packs that selectively apply a braking force to the drive mechanisms 32. However, the brake assemblies may be coupled to any component of the vehicle 10 that may be utilized to slow the vehicle 10. For example, brake assemblies may be provided along the driveshaft, axles, wheels, tracks, or in the transmission of the drive mechanism 32. In one aspect of this disclosure, the brake assemblies are a typical service brake assembly known in the art.

While the braking system 202 is described herein as being applied to the drive mechanism 32, this disclosure also considers applying a braking system to the power source 23 or components of the electric drive system 12 as well. More specifically, a braking system may be coupled to the driveshaft of the engine 24 to selectively apply a braking force thereto. Further, a braking system may be coupled to the generator 14 or motor 16 to selectively provide a braking force thereto. Accordingly, this disclosure contemplates implementing an electro-hydraulic braking system to any of the components of the power source 23, electric drive system 12, and drive mechanism 32.

The electro-hydraulic braking system 202 may be implemented to supplement any braking requirements of the work machine when the power source 23 and the electric drive system 12 are already functioning at a maximum braking capacity. More specifically, when a braking condition is required by the vehicle 10, in a reversal of direction situation for example, both the power source 23 and the electric drive system 12 may have insufficient braking capacity to successfully slow the work machine at a desired rate. In this situation, the electro-hydraulic braking system 202 may be implemented to ensure that neither the power source 23 nor the electric drive system 12 are damaged during a braking operation while still providing the desired braking force.

The controller 204 may communicate with, or be integrated into, the generator controller(s) 42, motor controller (s) 52, and transmission controller 36 to identify working conditions of the corresponding systems. For example, the controller 204 may communicate with the generator controller 42 to identify the available braking capacity of the generator(s) 14. In this example, the controller 204 may have stored therein a maximum braking capacity that can be applied to the power train 13 with the generator(s) 14. When a braking condition is identified, the controller 204 can identify the available braking force that the generator(s) 14 can apply to the power train 13 and adjust the braking force applied by the braking system 202 accordingly.

Similarly, the controller may monitor the power source 23 to identify the available braking force that can be applied to the power train 13 through the power source 23. In one non-exclusive example, the engine 24 may be defueled to provide a braking force on the power train 13. In this configuration, the controller 204 may store an engine braking force threshold therein that identifies the maximum braking force that may be applied by the engine 24 when it is defueled. More specifically, when a braking force is required, the motor(s) 16 may be back-driven in braking mode to provide a braking force on the drive mechanism 32. Similarly, the generator(s) 14 may be back-driven to consume electrical energy generated by back-driving the motors 16. The back-driven generator 14 may provide mechanical input to the engine 24. The engine 24 may be defueled in this situation to thereby resist the mechanical input from the generator 14.

In one non-exclusive example, the engine 24 may increase the braking force applied by the engine 24 by increasing the load on the engine 24. In one example, the engine 24 may have one or more parasitic devices 126 coupled thereto. The parasitic devices 126 may be any device that requires mechanical energy from the engine 24.

For example, the engine 24 may have a fan that is selectively powered by the engine 24 through a clutch to provide a parasitic load thereto. Similarly, one or more hydraulic pump may be selectively coupled to the engine 24 to provide an additional load thereto. Further still, an air conditioning compressor may be selectively engaged to increase the load on the engine 24 and thereby increase the engine braking force. In yet another example, the engine 24 may be selectively coupled to a flywheel or a hydraulic assembly may be fluidly coupled to a hydraulic accumulator to increase engine load. The parasitic loads described herein are meant as non-exclusive examples and are not exhaustive. Accordingly, this disclosure considers engaging any device that may be coupled to an engine to increase the load on the engine as a parasitic device.

In yet another aspect of this disclosure, the engine 24 may also perform a compression release function during engine braking to increase the braking force applied by engine braking. When a braking condition is identified, the controller 204 can identify the available braking force that the engine 24 can apply to the power train 13 and adjust the braking force applied by the braking system 202 accordingly.

Further still, the controller may monitor the electric drive system 12 to identify the available braking force that can be applied to the power train 13 through the electric drive system 12. In one non-exclusive example, the traction motor 16 may provide a braking force on the power train 13 when in the braking mode. When the motor 16 is in the braking mode, electrical power may be added to the power electronics 40 and dissipated or stored in via the bus 20. If the electrical power generated by the motor 16 exceeds the needs of the bus 20 as described above, the bus 20 may remove the excessive electrical power with the brake resistor 18. Further, the bus 20 may back drive the generator 14 to provide torque inputs to the engine 24 to further consume the electrical energy added during the braking function. In this configuration, the control unit 22 may store a motor braking mode force threshold therein that identifies the maximum braking force that may be applied by the motor 16 when it is in the braking mode. When a braking condition is identified, the control unit 22 can identify the available braking force that the electric drive system 12 can apply to the power train 13 and adjust the braking force applied by the braking system 202 accordingly.

Figure 2:
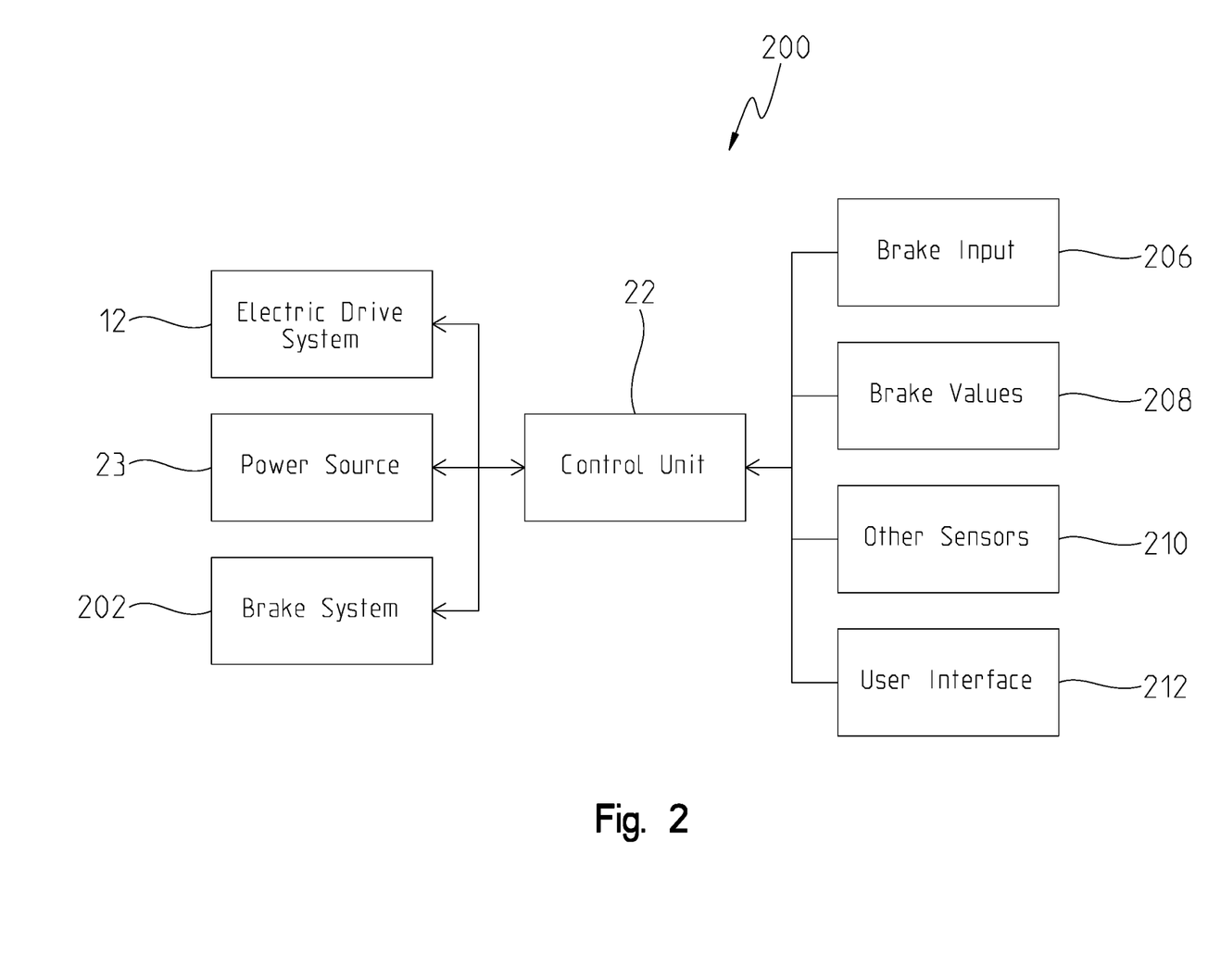

Referring now to FIG. 2, a schematic control system 200 is illustrated. The control system 200 utilizes the control unit 22 described above to execute the commands and analysis described herein. As described above, the control unit 22 may be one or more of the generator controller 42, motor controller 52, transmission controller 36, and brake system controller 204, and this disclosure contemplates many different types of controllers. In one non-exclusive example, the control unit 22 described herein may not be physically located on the vehicle 10. More specifically, this disclosure also contemplates embodiments where the control unit 22 is located remotely from the vehicle and wirelessly communicates with the vehicle 10.

The control unit 22 may communicate with the electric drive system 12 as described herein. The control unit 22 may manipulate the electrical configuration of the electric drive system 12 to work in a motoring mode or a braking mode as described. More specifically, in the motoring mode the control unit 22 may be converting mechanical energy provided to the generator 14 from the power source 23 into electrical energy that is thereby applied to the traction motor 16 to implement a driving force on the drive mechanism 32.

The motoring mode may be implemented by the control unit 22 when the vehicle 10 requires power input to the drive mechanism 32 to meet the user's demands. In one non-exclusive example, the motoring mode may be initiated if the user is increasing or maintaining the velocity of the vehicle 10.

Alternatively, the braking mode of the electric drive system 12 may be initiated by the control unit 22 to absorb power input into the vehicle 10 when permitted by the conditions of the vehicle 10. In one non-exclusive example, the braking mode may be initiated when the user indicates a desire to reduce the velocity of the vehicle 10 or when the vehicle is traveling down a grade. During the braking mode, the motor 16 may be back driven to act as a generator and thereby provide electrical energy to the bus 20. Similarly, the bus 20 may back drive the generator 14 to convert the electrical energy generated by the motor 16 to a torque input to the power source 23. In other words, a braking force may be applied to the drive mechanism 32 by back driving the components of the electric drive system 12 to provide a mechanical input to the power source 23 during the braking mode.

The power source 23 may also be in communication with the control unit 22 to transition between a motoring mode and a braking mode in conjunction with, or independent of, the electric drive system 12. The control unit 22 may provide fuel to the engine 24 of the power source 23 during the motoring mode to meet the needs of the vehicle 10. For example, the control unit 22 may increase the fuel provided to the engine 24 to thereby increase the output to the generator 14 when the user indicates a desire to increase the velocity of the vehicle 10. In turn, the electric drive system 12 may convert the mechanical energy of the power source into electrical energy with the generator 14. The additional electrical energy may be applied back to mechanical energy with the motor 16 to increase the output provided to the drive mechanism 32 to accommodate the user's command.

The power source 23 may also be in communication with the control unit 22 to implement a braking mode of the power source 23. In the braking mode of the power source 23, the control unit 22 may reduce or entirely cut off the amount of fuel provided to the engine 24. As a result, the power source 23 may provide a braking force to the generator 14. Further, electric drive system 12 may transmit the braking force applied by the power source 23 to the drive mechanism 32 as the motor 16 and generator 14 are back-driven. Accordingly, the power source 23 may apply a braking force to the drive mechanism 32 that is transmitted through the electric drive system 12 when the power source 23 is in the braking mode.

While the power source 23 is described herein in providing a braking force to the drive mechanism 32 through the electric drive system 12, this disclosure also considers embodiments where the power source is mechanically coupled to the drive mechanism 32 through a transmission or the like. In this configuration, the braking force created by defueling the power source 23 is directly applied to the drive mechanism 32 via the mechanical coupling. Accordingly, this disclosure also considers embodiments that do not have an electric drive system 12 at all.

Similarly, the control unit 22 may selectively apply the braking system 202 to add a braking force to the vehicle 10. The braking system 202 may be an electro-hydraulic system that is selectively engaged by the control unit 22 with one or more valves that are repositionable by the control unit 22. Further, the braking system 202 may have a braking mode and a release mode. In the release mode, the braking system 202 may be configured to maintain the brake of the braking system 202 in an unapplied position, wherein the brakes are not applying a substantial braking force to the corresponding portion of the drive mechanism 32. The brake system 202 is configured to minimize any braking forces applied by the braking system 202 when in the release mode.

Alternatively, the control unit 22 may manipulate the valves of the electron-hydraulic system of the braking system 202 to apply a braking force in the braking mode. More specifically, the control unit 22 can selectively direct hydraulic fluid to the brake utilizing the components of the electrohydraulic system as is known in the art.

Accordingly, each of the electric drive system 12, the power source 23, and the brake system 202 may be controlled by the control unit 22 to facilitate application of the braking mode of the vehicle 10. In one non-limiting example, in the powering mode the electric drive system 12 may be providing power to the motor 16 to move the drive mechanism 32 while the power source 23 provides mechanical energy to the generator 14 and the brake system 202 is in the release mode. Alternatively, in the braking mode the electric drive system 12 may back drive the traction motor 16 and the generator 14 to provide a mechanical input to the power source 23 while the power source 23 is defueled. Further, the brake system 202 may be applied in the braking mode to substantially supplement the braking force applied by the electric drive system 12 and the power source 23 to the drive mechanism 32.

In one aspect of this disclosure, the engine 24 may implement a compression release brake procedure as part of the braking mode. More specifically, the generator 14 may be back-driven in the braking mode as described above to mechanically drive or otherwise rotate the engine 24. In this situation, the engine 24 may be a diesel engine with a valve assembly that is selectively configured in a compression release brake orientation. The control unit 22 may orient the valve assembly of the engine 24 in the compression release brake orientation during the braking mode and thereby resist some of the torque input into the engine 24 from the generator 14 to create a greater braking force.

In the compression release brake orientation, the valve assembly of the engine 24 may fluidly couple the chamber of any pistons of the engine 24 to an exhaust channel after a compression cycle to increase the braking force applied to the engine 24. Compression release engine braking is commonly referred to as Jake brake and one example of a compression release braking system is the Jacobs' Compression Release Brake® by Jacobs Vehicle Systems®. Accordingly, one aspect of this disclosure considers utilizing the engine 24 to apply a compression release braking function during the braking mode similar to those implemented by Jacobs Vehicle Systems®.

The control unit 22 may also receive a brake input 206 from the vehicle 10. The brake input 206 may be input through a brake pedal, lever, a switch, or from any other input of the vehicle 10. In the brake pedal example, the brake input 206 may be determined by the control unit 22 by analyzing the position of the brake pedal with a position sensor or the like. In this configuration, the control unit 22 identifies the braking force required by the user by monitoring the position of the brake pedal.

Similarly, the control unit 22 may monitor a lever or joystick to determine the braking force desired by the user. In one non-exclusive example, the lever may be a FNR lever. The lever or joystick may be manipulated by the user to indicate the desired vehicle speed and direction. When the control unit 22 identifies a lever or joystick position that requires a braking input, the control unit 22 may transition the electric drive system 12, the power source 23, and the brake system 202 to the corresponding braking mode.

In yet another embodiment, the brake input 206 may be part of a vehicle speed regulator. More specifically, the vehicle 10 may have any number of other sensors 210 to monitor different components of the vehicle 10. In one example, one of the other sensors 210 may be a vehicle speed sensor. The vehicle speed sensor may communicate to the control unit 22 the vehicle speed. The control unit 22 may store a vehicle speed threshold therein and transition the electric drive system 12, power source 23, and brake system 202 into the braking mode when the vehicle speed is greater than the vehicle speed threshold. As one non-exclusive example, the vehicle speed threshold may be a maximum allowable vehicle speed. If the vehicle speed sensor identifies a vehicle speed greater than the maximum allowable vehicle speed, for example if an over speed condition occurs when the vehicle 10 is traveling down a steep grade, the control unit 22 may implement the braking mode to slow the vehicle 10.

Further, the control unit 22 may be in communication with a user interface 212 that allows the user to input control parameters for the vehicle 10. In one non-exclusive example, the user interface 212 may allow the user to input a desired vehicle speed. Once the user inputs a desired vehicle speed, the control unit 22 may monitor the vehicle speed sensor and implement the braking mode with the electric drive system 12, power source 23, and brake system 202 when the vehicle speed is greater than the desired vehicle speed input by the user in the user interface 212. In this example, the control unit 22 may implement the braking mode to allow the vehicle 10 to maintain a user-selected vehicle speed.

The control unit 22 may have stored therein braking values 208 that correspond with the available braking force of each of the electric drive system 12, power source 23, and brake system 202. Further, the control unit 22 may have a table, chart, graph, algorithm, executable program, or the like stored therein that correlates the brake input 206 to corresponding braking values 208 for each of the electric drive system 12, power source 23, and brake system 202. When the control unit 22 identifies a brake input 206, the control unit 22 may select braking values 208 for the electric drive system 12, power source 23, and brake system 202 that correspond with the brake input 206. Then, the control unit 22 may position each of the electric drive system 12, power source 23, and brake system 202 in the appropriate braking mode to apply the braking force that corresponds with the braking values 208. In other words, the control unit 22 receives the brake input 206 and then determines how to achieve the required braking force in view of braking forces that are applied by each of the electric drive system 12, power source 23, and brake system 202.

The other sensors 210 may include, among other sensors, a bucket position sensor. The bucket position sensor may be coupled to the bucket 118 of the vehicle 10 to identify the position of the bucket 118. In one aspect of this disclosure, the braking values 208 implemented by the control unit 22 may consider values from the other sensors 210 such as the bucket position sensor. More specifically, if the bucket position sensor indicates the bucket 118 is in a raised position, the vehicle 10 may be less stable during a braking procedure. Accordingly, the control unit 22 may apply different braking values 208 when the bucket 118 is in the raised position compared to when the bucket 118 is in a lowered position. In other words, the control unit 22 may utilize the other sensors 210 to identify other conditions of the vehicle that may affect the safe braking capacity of the vehicle 10 and therefore change the braking values 208 accordingly.

Figure 3:
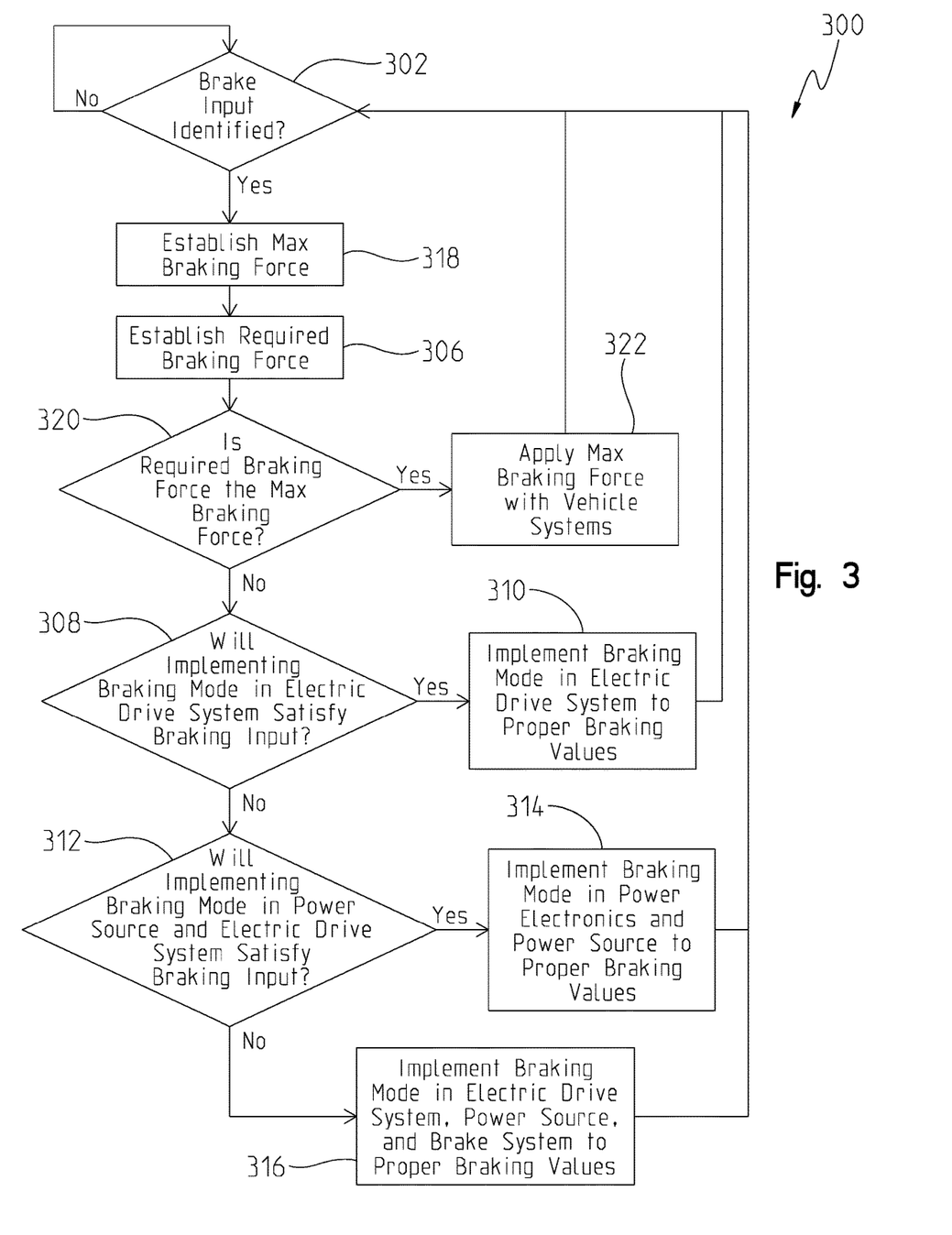
FIG. 3 is a flow chart of a brake duty control logic.

Referring now to FIG. 3, one non-exclusive example of a braking control logic 300 is illustrated. The braking control logic 300 may first utilize the control unit 22 to identify whether a brake input exists in box 302. The brake input of box 302 may be any of the brake inputs 206 described above. For example, the brake input may be from a FNR lever, a brake pedal, a joystick, a vehicle speed governor, a safety switch, or any other vehicle system or sensor that may be monitored to control vehicle velocity. Further, the brake input of box 302 may be any input identified by the control unit 22 that represents a desired vehicle speed. If no inputs are identified in box 302, the control unit 22 may continue to monitor the brake inputs 206 in box 302.

However, if the control unit 22 does identify a brake input 206 in box 302, the control unit 22 may determine a required braking force based on the brake input 206 in box 306. The required braking force identified in box 306 may be the braking force that is associated with the corresponding brake input 206. More specifically, the control unit 22 may determine the required braking force by identifying the brake values 208 based on the brake input 206. For example, the braking force values 208 and the corresponding required braking force may be greater when the control unit 22 identifies a substantial brake input (for example when the FNR transitions from a forward position to a reverse position) compared to when the brake input 206 is only a slight reduction in vehicle speed.

The control unit 22 may also have stored therein a maximum vehicle braking force in box 318. The maximum vehicle braking force may be a preset braking force stored in the control unit 22 that represents the maximum braking force the control unit 22 will implement with the vehicle 10. In one non-exclusive example, the maximum braking force may be the braking force applied when each of the power source 23, electric drive system 12, and brake system 202 are operating at a maximum braking mode. Alternatively, another embodiment allows the user to alter the maximum vehicle braking force via the user interface 212. In this embodiment, the user may select the aggressiveness in which they desire the vehicle to apply the braking force. A more aggressive maximum vehicle braking force will expose the vehicle to faster speed reductions through braking while a less aggressive maximum vehicle braking force will provide more prolonged speed reductions.

Box 318 may be executed at any time, and is positioned in the braking control logic 300 as shown in FIG. 3 for illustration only. This disclosure considers implementing box 318 at any time during the control logic 300.

Next, the control unit 22 may determine whether the required braking force of box 306 is the same or greater than the maximum vehicle braking force of box 318 in box 320. If the desired braking force is the same or greater than the maximum vehicle braking force, the control unit 22 may apply the maximum braking force in box 322 by transitioning each of the power source 23, electric drive system 12, and brake system 202 to the corresponding maximum braking force condition. In other words, if the control unit 22 identifies that the user wants to slow the vehicle 10 at the fastest allowable rate, the control unit 22 will apply the braking force with all of the available vehicle systems 23, 12, 202 that can provide a braking force on the vehicle 10.

However, if the control unit 22 determines that the required braking force of box 306 is not the same or greater than the maximum braking force of box 318, the control unit 22 may then determine whether implementing the braking mode of the electric drive system 12 will provide a sufficient braking force in box 308 to meet the required braking force requirements identified in box 306. More specifically, the control unit 22 may have stored therein a maximum electric drive system braking force that represents the maximum expected braking force that will be applied to the vehicle 10 when the electric drive system 12 is in maximum braking mode. In box 308, the control unit 22 compares the required braking force value identified in box 306 to the maximum electric system braking force. If the required braking force value is the same or less than the maximum electric system braking force, the control unit 22 initiates box 310 wherein the electric drive system 12 is placed in a braking mode that corresponds with the required braking force of box 306. In other words, if the control unit 22 identifies a braking force requirement that can be entirely addressed by the electric drive system 12, the control unit 22 will utilize the electric drive system 12 to apply the corresponding braking force.

However, if the maximum electric system braking force is less than the required braking force identified in box 306, the control unit 22 may implement box 312 wherein a maximum power source braking force is considered in comparison to the required braking force from box 306. The maximum power source braking force may be the maximum braking force applied to the vehicle 10 by the power source 23 when the power source is in a maximum braking mode. In one non-exclusive example, the maximum power source braking force may be the braking force applied by the power source 23 when the engine 24 is executing the engine compression release procedure described above. In box 312, the sum of the maximum electric system braking force and the maximum power source braking force is compared to the required braking force of box 306. In other words, the total braking force of the vehicle 10 as applied by both the electric drive system 12 and the power source 23 in the braking mode is compared to the required braking force from box 306 in box 312.

If the sum of the electric drive system 12 and power source 23 maximum braking force is equal to or greater than the required braking force, the control unit 22 will implement box 314 wherein the braking mode of both the electric drive system 12 and the power source 23 is implemented. In other words, if the maximum electric system braking force is less than the required braking force, but the combined braking force of the electric drive system 12 and the power source 23 is greater than or equal to the required braking force, the control unit 22 will implement the braking force with both the electric drive system 12 and the power source 23 to apply the required braking force 306.

In one aspect of boxes 312 and 314, the control unit 22 may also consider applying the brake compression release function to increase the maximum power source braking force. More specifically, as described above, the control unit 22 may selectively alter the valve positioning of the engine 24 to increase the braking force applied by the engine 24. Accordingly, boxes 312 and 314 may also consider implementing a compression release function with the engine 24 to meet the required braking force of box 306. Further still, in yet another embodiment of boxes 312 and 314 the control unit 22 may apply a load with any of the parasitic devices 126 described herein to increase the braking force that can be applied by the engine 24 by adding parasitic loads to the engine 24.

While boxes 308 and 312 are described herein as separate considerations of the control unit 22, this disclosure also considers executing boxes 308 and 312 at substantially the same time. More specifically, the control unit 22 may determine the overall maximum braking capacity of both the electric drive system 12 and the power source 23 working in the braking mode in the same step. Alternatively, this disclosure also considers embodiments that do not have an electronic drive system 12 at all. In this configuration, the control unit 22 will only determine whether the maximum braking force of the power source 23 is sufficient to meet the required braking force before executing box 316.

If the sum of the braking force available from both the electric drive system 12 and the power source 23 is less than the required braking force 306, the control unit 22 may implement box 316 to apply the brake system 202. In box 316, the control unit 22 may have both the electric drive system 12 and the power source 23 applying the maximum braking force and utilize the electro-hydraulic control of the brake system 202 to add a brake system braking force. The control unit 22 may use as little of the brake system braking force as needed to meet the required braking force. In other words, the control unit 22 may implement a full braking force of both the electric drive system 12 and the power sources 23 before the brake system 202 is engaged.

In one aspect of this disclosure, the brake system 202 may be an electro-hydraulic system that allows the control unit 22 to vary the braking force applied by the brake system 202. In other words, the brake system 202 may have at least one variable pressure solenoid valve or the like that is controlled by the control unit 22 to provide variable fluid pressures to the brakes of the brake system 202. In this embodiment, the maximum braking force of the vehicle 318 may be controlled by control unit 22 through the brake system 202. The control unit 22 can control the amount of pressure applied to the brakes of the brake system 202 to thereby control the speed at which the vehicle 10 is slowed during a maximum braking input operation.

As described above, the maximum vehicle braking force 318 may be established as part of an input from the user interface 212. More specifically, the user may select the aggressiveness of a braking profile. In one non-exclusive example, the aggressiveness of the braking profile may be selected as either mild or aggressive. If the user selects a mild profile, the control unit 22 may implement a lower maximum braking force of the vehicle 318 and thereby manipulate the brake system 202 accordingly. Alternatively, if the user selects an aggressive braking profile the control unit 22 may implement a high braking force for the maximum braking force of the vehicle 318 and manipulate the brake system 202 accordingly. In other words, the user may provide an input to manipulate the intensity with which the control unit 22 will utilize the brake system 202 to slow the vehicle 10.

While a mild and aggressive option are described herein, any number of maximum braking force settings are contemplated as well. Further, in one nonexclusive example, the maximum braking force of the vehicle 318 may be established automatically with the control unit 22 by monitoring the other sensors 210. More specifically, the other sensors 210 may include a vehicle speed sensor or a bucket position sensor to name a coupled of non-exclusive examples. The maximum braking force of the vehicle 318 may be altered by the control unit 22 based on the position of the bucket 118 or speed of the vehicle as determined by the other sensors 210. Accordingly, in one aspect of this disclosure the maximum braking force of the vehicle 318 is determined by the control unit 22 automatically based on values identified by the other sensors 210.

In one embodiment of the present disclosure, the other sensors 210 may include temperature sensors that communicate with the control unit 22 to identify the temperatures of components of the electric drive system 12, the brake system 202, and the power source 23. In one application of this disclosure, the control unit 22 may alter the braking priority applied during a braking condition based on the temperatures identified by the temperature sensors. More specifically, in one non-exclusive example the control unit 22 may increase the braking force applied by the braking system 202 when the electric drive system 12 is operating above a stored temperature threshold. Alternatively, the electric drive system 12 and power source 23 may provide greater braking force when the braking system 202 is operating above a braking system temperature threshold.

The temperature sensors may provide readings of any component of the power source 23, electric drive system 12, and brake system 202. As one non-exclusive example, a coolant temperature of the engine 112, the brake resistor 18 temperature, and a brake temperature may be monitored by the control unit 22. However, this disclosure considers monitoring the temperature of any component of the vehicle 10 to identify when the corresponding component is being overworked. Similarly, this disclosure also contemplates monitoring the electrical conditions, such as voltage, of the electric drive system 12 to identify when the electric drive system is being overworked during the braking mode.

In one aspect of this disclosure, the brake system 202 may be utilized to implement a coast control braking speed desired by the user. The coast control braking speed may be the speed at which the vehicle 10 slows during a coast condition wherein no throttle input is identified. In one aspect of this embodiment, the user interface 212 may be selectable by the user to select the aggressiveness with which the control unit 22 will apply the braking logic described above during a coast situation. Similar to the max braking functionality described above, the user may select the aggressiveness of the coast control option from the user interface 212 and the control unit 22 may apply the selected coast control during a coast condition. In one aspect of this embodiment, the control unit 22 may first fully apply the braking force available from the electric drive system 12 and power source 23 during a coast condition. Then, the control unit 22 may apply the brake system 202 to provide a supplemental braking force that corresponds with the coast control option selected by the user.

Any number of coast control settings are contemplated. In one nonexclusive example, the coast control may be established automatically with the control unit 22 by monitoring the other sensors 210. More specifically, the other sensors 210 may include a vehicle speed sensor or a bucket position sensor to name a coupled of non-exclusive examples. The coast control of the vehicle 10 may be altered by the control unit 22 based on the position of the bucket 118 or speed of the vehicle as determined by the other sensors 210. Accordingly, in one aspect of this disclosure the coast control is determined by the control unit 22 automatically based on values identified by the other sensors 210.

In yet another aspect of this disclosure, the brake system 202 may be the sole braking force applied by the control unit 22 during a coast situation. In this embodiment, the control unit 22 applies the brake system 202 when there is no longer a throttle command in the vehicle 10. Further, in this embodiment the control unit 22 may apply the brake system 202 based on the braking aggressiveness identified by the user via the user interface 212 or based on a default coast control stored in the control unit 22.

In yet another embodiment of the present disclosure, the control unit 22 may implement the braking control logic 300 during an emergency event. In one example, the emergency event may be a potential collision identified by one of the other sensors 210 (for example, a proximity sensor may identify a barrier in the projected path of travel of the vehicle 10). In another example, the emergency event may be identified via one of the other sensors 210 indicating there is not a user in a seat of the operator cab 114. In yet another example, the emergency event may be initiated when the vehicle 10 travels outside of a geographic area. Regardless of the source, the emergency event may indicate a brake input at the max braking force 318. Accordingly, once the control unit 22 identifies an emergency event, the control unit 22 will implement the braking control logic 300 at the max braking force 318.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this pertains and which fall within the limits of the appended claims.

The invention claimed is:

1. A system for controlling the speed of a hybrid work machine, comprising: an engine assembly; a lever that is repositionable to identify a desired speed and direction of the work machine; an electric drive system mechanically coupled to the engine assembly; a drive mechanism configured to be driven by the electric drive system and having a brake system; and a controller in communication with the engine assembly, the electric drive system, and the drive mechanism; wherein, the controller selectively engages the engine assembly, the electric drive system, and the drive mechanism to execute a braking function when vehicle speed is greater than a maximum speed threshold regardless of the position of the lever; further wherein, the controller monitors the temperature of each of the electric drive system, the brake system, and the engine assembly and establishes a braking priority for the engine assembly, the electric drive system, and the drive mechanism based on the monitored temperatures.

2. The system of claim 1, further wherein the brake system is an electro-hydraulic brake system coupled to the drive mechanism, wherein the electro-hydraulic brake system is selectively applied by the controller to execute the braking function.

3. The system of claim 2, further wherein when the controller identifies a speed reduction command that is greater than a speed reduction threshold, the controller applies a braking force to the drive mechanism with the electro-hydraulic brake system.

4. The system of claim 3, further wherein when the speed reduction command is less than the speed reduction threshold, the controller engages the engine assembly and the electric drive system to apply a braking force and does not engage the electro-hydraulic assembly when the monitored temperatures of the engine assembly and electric drive system are below corresponding temperature thresholds.

5. The system of claim 1, further comprising user controls that send a required brake force command to the controller and a user interface that provides selectable braking profiles, wherein the controller is configured to compare the required brake force command to a brake force threshold of the braking profile and direct braking force commands to the engine assembly, electric drive system, and drive mechanism based on the comparison of the required brake force command to the brake force threshold.

6. The system of claim 1, further wherein the engine assembly implements a compression release brake procedure as part of an engine assembly braking function.

7. The system of claim 1, further wherein the controller selectively applies the braking function with the engine assembly, electric drive system, and drive mechanism based on a braking priority stored in the controller and the monitored temperatures of each of the engine assembly, electric drive system, and drive mechanism, wherein the braking priority initiates an engine braking function with the engine assembly and an electric braking function with the electric drive system prior to executing a drive mechanism braking function with drive mechanism when the monitored temperatures are within corresponding temperature thresholds.

8. The system of claim 1, further wherein the controller has a user selectable coast control braking setting that is selectable to apply a coast control braking force as part of the braking function applied when no throttle input is identified by the controller.

9. The system of claim 1, further comprising a proximity sensor that identifies barriers along a path of travel, wherein the controller applies the braking function when the proximity sensor identifies a barrier.

10. A method for controlling the speed of a hybrid vehicle, comprising:
providing an engine assembly having an engine, an electric drive system mechanically coupled to the engine, a drive mechanism configured to be driven by the electric drive system and having an electro-hydraulic brake system, a user interface providing selectable braking profiles, and a controller in communication with the engine assembly, the electric drive system, the electro-hydraulic brake system, and the user interface;
identifying, with the controller, a vehicle speed reduction signal;
monitoring, with the controller, temperatures of each of the engine, the electric drive system, and the electro-hydraulic brake system;
selectively executing, with the controller, an engine brake procedure, an electric drive system brake procedure, and a drive mechanism brake procedure based on the braking profile selected on the user interface and the temperatures of the engine, electric drive system, and the electro-hydraulic brake system responsive to the vehicle speed reduction signal.

11. The method of claim 10, further wherein the drive mechanism brake procedure is executed by the controller by engaging a hydraulic brake with the electro-hydraulic brake system.

12. The method of claim 11, further wherein the hydraulic brake is positioned at an axle of the hybrid vehicle to selectively apply a braking force to the axle.

13. The method of claim 10, further wherein the engine brake procedure includes implementing a compression release orientation of a valve assembly of the engine.

14. The method of claim 10, further wherein the engine assembly includes at least one parasitic device selectively coupled to the engine by the controller, wherein the controller couples the parasitic device to the engine during the engine brake procedure.

15. The method of claim 10, further wherein the engine brake procedure is executed by setting a generator of the electric drive system to a motoring mode to provide torque to the engine only when an engine speed is less than an engine speed threshold.

16. The method of claim 10, further wherein the controller executes the engine brake procedure and defuels the engine before executing the drive mechanism brake procedure.

17. The method of claim 10, further comprising:
storing an engine brake capacity, electronic assembly brake capacity, and a drive mechanism brake capacity;
determining, with the controller, a required brake capacity based on the vehicle speed reduction signal; and
implementing the drive mechanism brake procedure only when the required brake capacity is greater than the combined engine brake capacity and the electronic assembly brake capacity.

18. The method of claim 10, further comprising:
modifying the engine brake procedure, electronic assembly brake procedure, and drive mechanism brake procedure based on the monitoring step by altering a braking priority of the engine brake procedure, electronic assembly brake procedure, and the drive mechanism brake procedure based on the corresponding temperatures.

19. A work machine, comprising:
an engine assembly coupled to a drive mechanism to selectively provide a braking force to the drive mechanism up to a maximum engine braking force;
an electro-hydraulic brake assembly that selectively applies a supplemental braking force to the drive mechanism;
a bucket having a bucket position sensor;
a brake input;
a plurality of temperature sensors configured to identify temperatures of the engine assembly, the drive mechanism, and the electro-hydraulic brake assembly; and
a controller in communication with the bucket position sensor, engine assembly, the electro-hydraulic brake assembly, the brake input, and the plurality of temperature sensors;
wherein, the controller identifies a required braking force with the brake input and applies the supplemental braking force when the required braking force is greater than the maximum engine braking force;
further wherein, the supplemental braking force varies based on the position of the bucket and the temperature of each of the engine assembly, the drive mechanism, and the electro-hydraulic brake assembly.

20. The work machine of claim 19, further wherein the brake input is any one of a forward-neutral-reverse lever, a brake pedal, a switch, a cruise control interface, or a speed governor.

* * * * *